United States Patent [19]
Kuester

[11] Patent Number: 5,327,284
[45] Date of Patent: Jul. 5, 1994

[54] DEVICE FOR DERIVING THREE DIMENSIONAL EFFECTS FROM A SINGLE TWO DIMENSIONAL IMAGE

[76] Inventor: Harold H. Kuester, 10627 Haller St., Defiance, Ohio 43512

[21] Appl. No.: 889,165

[22] Filed: May 27, 1992

[51] Int. Cl.⁵ .......................................... G02B 27/22
[52] U.S. Cl. ................................ 359/479; 359/472; 359/473; 359/482
[58] Field of Search ............... 359/471, 473, 482, 478, 359/479, 472

[56] References Cited

U.S. PATENT DOCUMENTS

| | | | |
|---|---|---|---|
| 1,636,450 | 5/1924 | Ames, Jr. | 359/478 |
| 2,084,795 | 6/1937 | Donle | 359/478 |
| 2,297,322 | 9/1942 | Rasco | 359/479 |
| 2,337,139 | 12/1943 | Veatch | 359/479 |
| 4,027,947 | 6/1977 | Taylor | 359/478 |
| 4,264,152 | 4/1981 | Crane | 359/1 |
| 4,333,707 | 9/1980 | West | 359/478 |
| 4,526,439 | 7/1985 | Okoshi et al. | 353/7 |
| 4,651,219 | 3/1987 | Rickert | 358/89 |
| 4,756,601 | 7/1988 | Schroder | 359/462 |

FOREIGN PATENT DOCUMENTS

WO/92/072-92 4/1992 PCT Int'l Appl. .................. 359/479

*Primary Examiner*—Scott J. Sugarman
*Attorney, Agent, or Firm*—Marshall & Melhorn

[57] ABSTRACT

An optical device which provides a three dimensional view of a two dimensional image, such as a television picture. A plurality of mirrors is utilized to present to the two eyes images which are displaced from positions which would normally occur without the interposition of said optical device. As a part of this process, the two images are slightly rotated in opposite directions. When the mirrors are suitably adjusted, the two displaced images appear to merge and form a three dimensional image.

14 Claims, 2 Drawing Sheets

DEVICE FOR DERIVING THREE DIMENSIONAL EFFECTS FROM A SINGLE TWO DIMENSIONAL IMAGE

BACKGROUND OF THE INVENTION

1. Field of the Invention

The present invention relates to improvements in stereoscopic viewing devices and, more particularly, to a device for producing a three dimensional effect utilizing a single two dimensional image.

2. Summary of the Related Art

The existing devices for three dimensional viewing typically are divided into two broad categories, devices for projection of stereoscopic images and stereoscopic devices for viewing two dimensional images. For projection of stereoscopic images, such as in movie presentations, special stereo-diaprojectors or stereo overhead projectors may be used. Separation of the images is generally achieved through polarization filters in front of the projector objectives and through polarization spectacles worn by the user.

The present invention is primarily concerned with the second category, stereoscopic devices for viewing two dimensional images. Depth perception cues are modified or suppressed to alter the viewer's stereoscopic judgment. A pair of stereoscopic images is formed with lenses or mirrors positioned close to the eyes. The stereoscopic devices for viewing two dimensional images have been limited primarily to photographic slides and X-ray applications. The devices are bulky, expensive, and not generally suited for alternative uses, such as watching television.

In several more recent patents, devices have been disclosed which modify depth perception cues at the image such that viewers do not require individual devices to achieve three dimensional viewing. Considerable efforts have been made to create a simple and inexpensive means for providing stereoscopic television.

Three dimensional viewing, in general, relies upon two fundamental classes of depth perception cues: (1) binocular cues; and (2) pictorial cues.

The most generally acknowledged binocular cues are retinal disparity, convergence and accommodation. Retinal disparity refers to the disparity between the retinal image of an object in one eye as compared to the image of the same object in the other eye. Such disparity generally decreases as the square of the distance of the object and is interpreted by the mind as a function of distance. The depth effect produced in the mind by retinal disparity is known as stereopsis.

Convergence refers to the angle formed by the two eyes as they focus upon an object. The two eyes would be parallel if an object could be viewed at an infinite distance. Increased convergence seems to cause the mind to diminish the estimated size of the object.

Accommodation refers to the ability of the ciliary muscles surrounding the lens of an eye to alter the thickness of the lens, thereby sharply focusing the light rays coming from an object. Both convergence and accommodation are dependent upon the actual distance of the object from the observer and, therefore, in principle, could be utilized to judge absolute distance. However, in practice, the mind utilizes them only in the case of short distances. Accommodation by itself is operative only for approximately two or three feet. Convergence utilized by itself is a rather unreliable judge of distance. Utilized together, convergence and accommodation are operative to a distance of about ten feet from the observer.

Pictorial cues are those which are available if a scene is viewed with only one eye. Some of the most common pictorial cues are as follows:

interposition (partial covering of one object by another), shadow, linear perspective (convergence of lines as they recede into the distance), size perspective (visual angle of an object is inversely proportional to the distance), foreshortening perspective (differences in the projection of distances in the third dimension, e.g., differences in the sizes of railroad ties as the track recedes into the distance), detail perspective (loss of detail with distance), aerial perspective (distant objects become tinged with a blue color due to impurities in the atmosphere), texture gradients (the texture within a scene becomes more finely grained with distance), familiar size, and motion parallax (the diminution of apparent motion (whether of the observer or of the observed) with distance).

Cues may interact with one another and produce mental depth perception effects which the cues would not produce if operating in isolation from one another. Our limited knowledge, at the present time, of the human visual system and the interpretation of these cues by the human brain does not permit exact descriptions of the interactions of the various cues.

A number of devices have been developed for providing a three dimensional view from a two dimensional image. As noted above, one group of devices includes auxiliary optical means positioned close to the eyes, such as the devices disclosed in U.S. Pat. Nos. 2,084,795; 2,088,041; 2,297,322; 2,337,139; and 4,027,947. Another group of devices achieves a three dimensional effect by modifying the cues using devices positioned in the vicinity of the two dimensional image, such as the devices disclosed in U.S. Pat. Nos. 4,526,439; 4,651,219; and 4,756,601.

Although the patents referenced above do not expressly discuss the applicable cues, the patents may be interpreted as referring to devices which manipulate binocular cues (mainly retinal disparity and convergence) and, in some cases, pictorial cues.

U.S. Pat. No. 2,084,795 utilizes cylindrical lenses in close proximity to and entirely covering a two dimensional image, or cylindrical mirrors onto which a two dimensional image is projected, or a combination of the two. The fundamental purpose of the use of such lenses and mirrors is to alter the original two dimensional image in such a manner that the image seen by one eye has a different angle of rotation from that seen by the other eye. The explanation disclosed in the patent for the resulting three dimensional effect is "that when the right and left eyes are slightly rotated on their optical axes ... the resultant strain on the eye muscles is registered on the brain as distance." These optical manipulations involve the cues of retinal disparity or convergence. The present invention accomplishes this purpose by a very different means; namely, by means of small, flat mirrors positioned in proximity to the eyes of the observer.

Although there is little explanation as to how three dimensional viewing is achieved in U.S. Pat. Nos. 2,297,322; 2,337,139 and 4,027,947, the devices disclosed in the patents use a mirror to split a two dimensional image into two images: one of the images is a view of the two dimensional image from the left side and the other image is a view from the right side. Then the images are reversed so that the left eye views the right image and the right eye views the left image. Reversing the image alters the cues of retinal disparity or convergence.

SUMMARY OF THE INVENTION

An object of the present invention is to enhance the three dimensional image produced by a device when viewing a two dimensional object. Certain view displacements of the present invention enhance the three dimensional effects of the device. The enhanced image should be produced by a device that is relatively simple and convenient to operate and adjust.

Another object of the present invention is to reduce the size of the housing required for the viewing device. A simplified positioning scheme permits the mirrors to be mounted in a relatively small housing without reducing the three dimensional effect of the device.

Another object of the present invention is to provide a light-weight viewing device that is comfortable to use. The weight of the device must be reduced so that the viewer may wear the device similar to a face mask or a pair of glasses. The set up and adjustment of the device should not be complicated.

A further object of the present invention is to develop a device that is cost efficient from a manufacturing standpoint. Nearly everyone watches television and could be a potential purchaser of the device. Maintaining costs as low as possible is an important consideration.

In accordance with the present invention, there is provided a viewing device having a housing which includes a receiving aperture and a viewing aperture. A receiving mirror reflects light rays from a two dimensional object to two smaller viewing mirrors, one for each eye. The viewing mirrors are each affixed to a longitudinal shaft, the shafts being located at an unequal distance from the reflecting mirror. The viewing mirrors may be adjusted until the two images produced by the viewing mirrors are merged into one image. The mounting disparity enhances the three dimensional effect by means of image disparity.

Unlike similar viewing devices, the present invention does not require a reversal of the two images in order to obtain a three dimensional effect. The three dimensional effect is enhanced when there is a significant change of either a) the angle from which either eye ordinarily views a two dimensional image; or b) the distance and the corresponding angle of vision from which either eye ordinarily views a two dimensional image. At a minimum, such change affects the retinal disparity cues or the convergence cues. The displacements of the images resulting from such change may be either horizontal or vertical. A displaced image may be presented to both eyes or only to one eye.

It is submitted that certain displacements enhance the three dimensional effect more than others. The device of the present invention optimizes the three dimensional effect by vertically and horizontally displacing the images viewed by the two eyes and, additionally, causes the two images seen by the two eyes to have different angles of rotation. When the two images are merged by binocular vision and thus viewed as a single image, a very pronounced three dimensional effect results.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
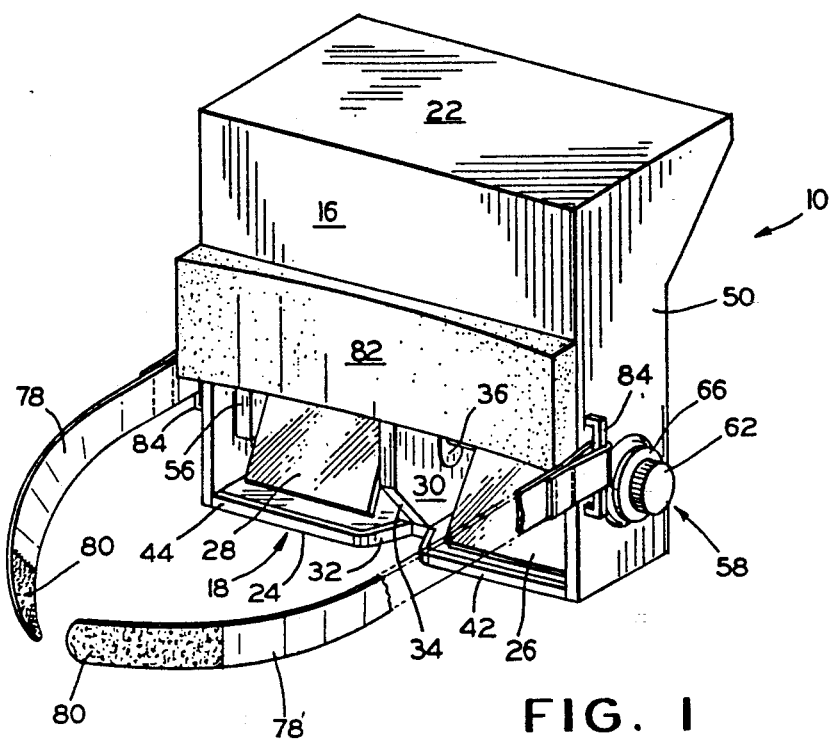
FIG. 1 is a perspective view of the viewing device of the present invention.
Figures 2, 3:
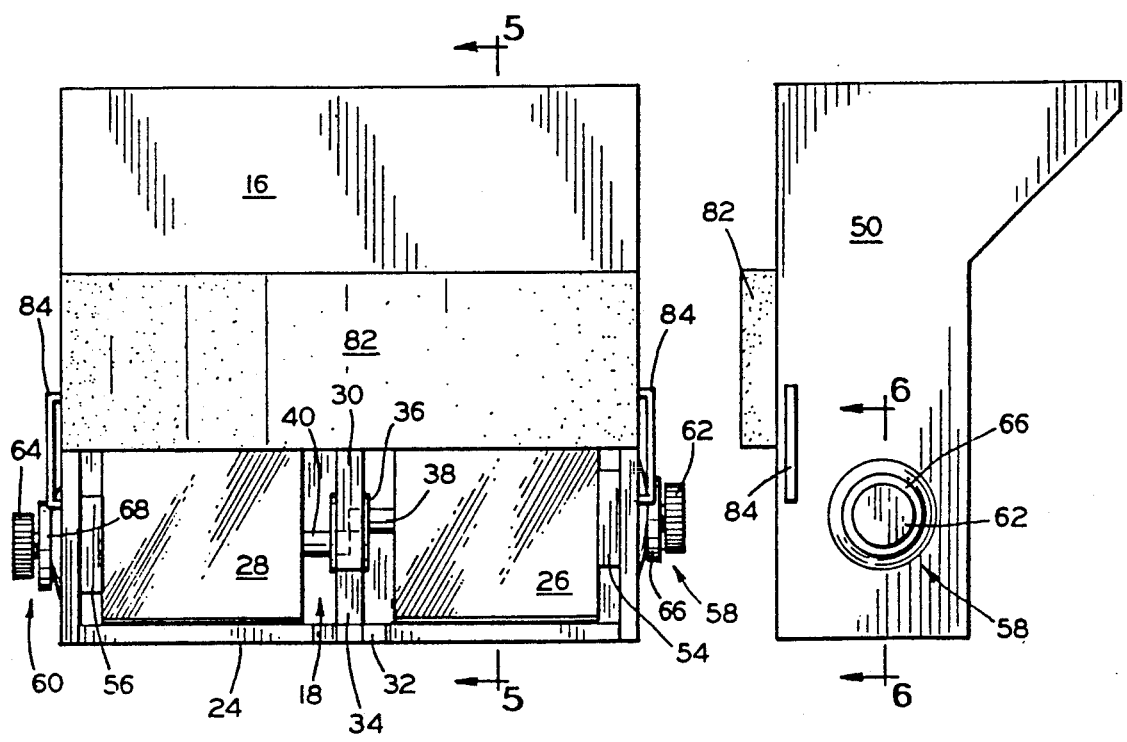
FIG. 2 is a front view of the viewing device shown in FIG. 1.
FIG. 3 is a side view of the viewing device shown in FIG. 1.
Figure 4:
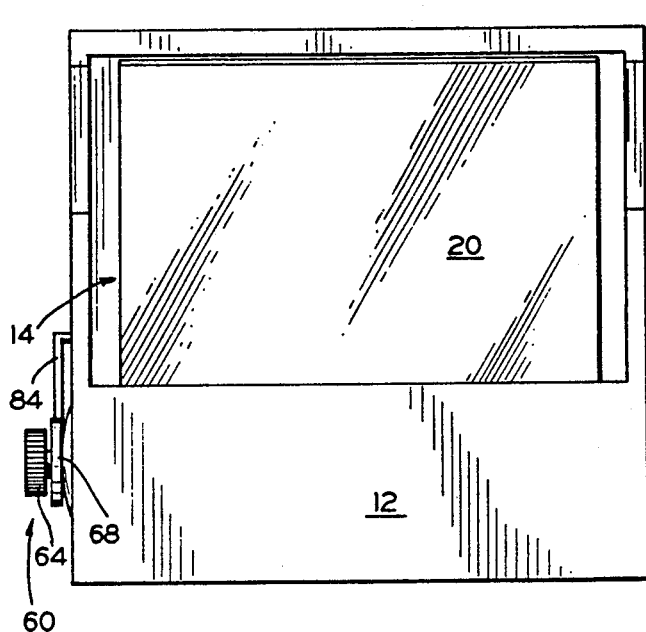
FIG. 4 is a back view of the viewing device shown in FIG. 1.

Referring now to FIGS. 1-4 of the drawings, there is shown in FIG. 1 a perspective view of the viewing device. The viewing device includes a housing 10 having a receiving face 12 with an aperture 14. On the opposite side of the housing 10 is the viewing face 16 having a viewing aperture 18.

A receiving mirror 20 is mounted in front of the receiving aperture 14 with the mirror 20 being fixed in a downward position at approximately a 45 degree angle with respect to the planar surfaces of the top 22 and bottom 24 of the housing 10.

A right viewing mirror 26 and a left viewing mirror 28, each less than half the size of the receiving mirror 20, are positioned beneath the receiving mirror 20 in front of the viewing aperture 18 of the housing 10. The viewing mirrors 26 and 28 face upward at an angle of approximately 45 degrees in generally parallel planes to the receiving mirror 20.

The viewing mirrors 26 and 28 are mounted at approximately an equal distance from the viewing aperture 18, but an unequal distance from the receiving mirror 20. The mirrors 26 and 28 are spaced so that the distance between the centers of the two mirrors is approximately the same as the distance between the eyes of the viewer. When in use, the nose of the viewer is positioned in the nose gap 32. The nose gap 32 and edges 42 and 44 of the lower surface, which rest against the cheeks of the viewer, are padded for viewer comfort.

A planar partition 30 extends from the nose gap 32 to the receiving face 12 of the housing 10 to separate the right viewing mirror 26 from the left viewing mirror 28. The partition 30 includes an angled edge 34 to permit proper positioning of the nose of the viewer in the nose gap 32. The partition 30 also includes a two-sided journal or flexible gasket 36.

Figure 5:
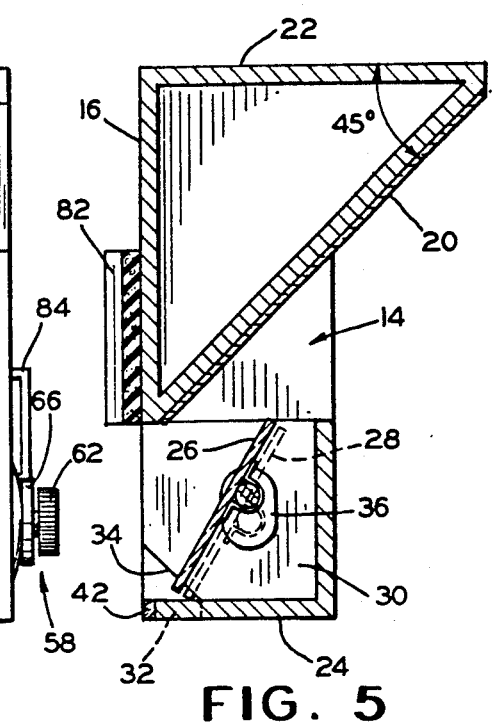
FIG. 5 is a sectional view of the viewing device taken along line 5—5 of FIG. 2.
Figure 6:
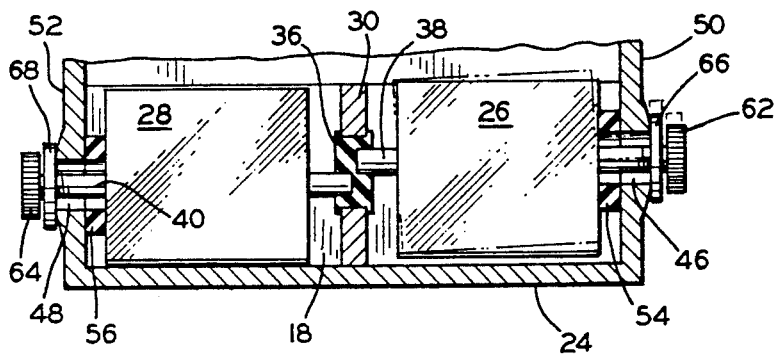
FIG. 6 is a sectional view of the viewing device taken along line 6—6 of FIG. 3.

A right positioning shaft 38 extends from one side of the journal 36 and a left positioning shaft 40 extends from the opposite side of the journal 36. In order to achieve the desired displacement, one shaft is mounted above the other shaft. As shown in FIGS. 5-6, the right shaft 38 is connected to the journal 36 above the left shaft 40.

The positioning shafts 38 and 40 extend longitudinally from opposite sides of the journal 36 and are affixed to the respective viewing mirrors 26 and 28. The right positioning shaft 38 extends through an enlarged aperture 46 in the side 50 of the housing 10. Similarly, the left positioning shaft 40 extends through an enlarged aperture 48 in the opposite side 52 of the housing 10. Spacers 54 and 56 are place between the viewing mirrors 26 and 28 and the sides 50 and 52 of the housing 10 to limit longitudinal movement of the viewing mirrors 26 and 28.

The positioning shafts 38 and 40 each include an adjustment means 58 and 60 mounted on the ends of shafts 38 and 40 on the exterior surface of sides 50 and 52. The adjustment means 58 and 60 are used to position the viewing mirrors 26 and 28 in the desired position for viewing and include rotational grips 62 and 64 which may be turned by the viewer to rotate the respective viewing mirrors 26 and 28 about positioning shafts 38 and 40. The adjustment means 58 and 60 slidingly engage the sides 50 and 52 of the housing 10. The grips 62 and 64 are also used by the viewer to maneuver the viewing mirrors 26 and 28 to the desired positions. The mirrors 26 and 28 are restricted from moving in a longitudinally sideways direction.

The journal 36 facilitates rotational movement of the shafts 38 and 40. The journal 36 also retains one end of the shafts 38 and 40 while permitting the external ends of the respective shafts 38 and 40 to be moved by sliding the adjustment means 58 and 60, subject to the restrictive engagement of the positioning shafts 38 and 40 against the inner surface of the respective side apertures 46 and 48. Once the viewing mirrors 26 and 28 are in the desired position, the locking means 66 and 68 are tightened to secure the viewing mirrors 26 and 28 in position.

Figure 7:
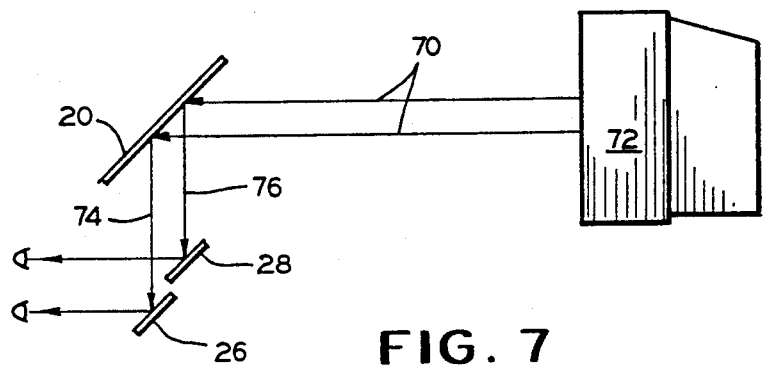
FIG. 7 is a schematic view of the light path from the two dimensional object to the eyes of the viewer.

FIG. 7 shows the path of the light rays 70 coming from a two dimensional image, such as television screen 72. The rays 70 are reflected downward at the receiving mirror 20 to the viewing mirrors 26 and 28 and then to the eyes of the viewer. The vertical distance between the receiving mirror 20 and the viewing mirrors 26 and 28 is always greater for the one side 76 than it is for the other side 74. This image displacement is used to enhance the three dimensional effect.

The housing 10 includes a head strap 78 for positioning the housing 10 on the front of the viewer's head such that the viewing aperture 18 is aligned with the viewer's eyes. Fasteners 80, such as velcro fasteners, may be used to tighten the head strap 78 to the desired size. A contoured head rest 82 is mounted on the viewing face 16 above the viewing aperture 18 such that the head rest 82 engages the forehead of the viewer when the device is in position for viewing. The straps 78 are connected to the housing 10 by external connectors 84 mounted on the sides 50 and 52 of the housing 10.

Other means may also be used to position the housing 10. A light-weight helmet or frame (not shown) may be worn on the head of the viewer with the housing 10 mounted on the front of the helmet.

In operation, the device is strapped to the head of the viewer such that the nose of the viewer fits comfortably in the nose gap 32. The viewing mirrors 26 and 28 are positioned in such a manner that a two dimensional image, such as an image from a television screen 72, appears to be approximately in the middle of the viewing mirrors 26 and 28.

The initial adjustment in preparing the device for viewing purposes is to slide the adjustment means 58 and 60 on the side surfaces 50 and 52 until one corner of the two dimensional image as seen by one of the eyes is angled slightly downward and the same corner as seen by the other eye is angled slightly upward. After the initial adjustment, the locking means 66 and 68 should be tighten to hold the positioning shafts 38 and 40 and the viewing mirrors 26 and 28 loosely in place.

For final adjustment, the grips 62 and 64 are rotated to rotatably move the viewing mirrors 26 and 28, which should then bring the two images into alignment such that the two images appear to merge. The locking means 66 and 68 may then be firmly tightened to maintain the position of the viewing mirrors 26 and 28. If the two images do not appear to merge, the entire adjustment process must be repeated until the images merge. In the event that the images merge but after a period of time seem to produce eye strain, it may be necessary to decrease the difference between the rotational angles of the two images in order to more closely align the two images with one another.

In addition to a viewing device utilizing vertical displacement, a viewing device may also utilize horizontal displacement or a combination of horizontal and vertical displacement to obtain a three dimensional effect. If horizontal displacement is used (not shown), the equivalent housing 10 would be a wider housing with two receiving apertures 14 typically located toward the two sides of the receiving face 12. The adjustment knobs 58 and 60 would then be moved to the top or bottom of the housing 10 and the positioning shafts 38 and 40 would be mounted vertically.

In the present invention, only three mirrors were used to transmit the image to the viewer. Additional mirrors could be used to transmit the image within the housing in order to produce the desired three dimensional effect. For example, the horizontal displacement device described above would require a minimum of four mirrors.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An optical device for viewing a two dimensional image in three dimensional form comprising:
   a) a housing, including a receiving aperature on a face of said housing and a viewing aperture on an opposite face of said housing;
   b) a receiving mirror mounted in the receiving aperture of said housing for receiving a two dimensional image;
   c) a right viewing mirror positioned in the viewing aperture and mounted on a right positioning means, said right viewing mirror in optical communication with said receiving mirror for providing a first image of the two dimensional image;
   d) a left viewing mirror positioned in the viewing aperture, spaced apart from said right viewing mirror, and mounted on a left positioning means, said left viewing mirror in optical communication with said receiving mirror for providing a second image of the two dimensional image different from the first image;

e) a center journal positioned between said left viewing mirror and said right viewing mirror, said center journal adjustably retaining a first end of the right positioning means and a first end of the left positioning means such that a longitudinal center axis of the right positioning means is vertically spaced apart from a longitudinal center axis of the left positioning means; and f) a pair of adjustment means externally positioned on said housing, a right adjustment means secured to a second end of the right positioning means and a left adjustment means secured to a second end of the left positioning means, each positioning means extending through an oversized aperture in said housing to facilitate normal movement and rotational movement of the adjustment means to position said right viewing mirror and said left viewing mirror whereby the positioning of said viewing mirrors causes the first image and the second image to merge and form a three dimensional image.

2. The optical device defined in claim 1 including a plurality of mirrors mounted in said housing for providing optical communication between said receiving mirror and said right and left viewing mirrors.

3. The optical device defined in claim 1 wherein the right positioning means includes a right positioning shaft connected to and extending longitudinally across said right viewing mirror and the left positioning means includes a left positioning shaft connected to and extending longitudinally across said left viewing mirror.

4. The optical device defined in claim 3 wherein said adjustment means includes a right knob mounted on the right positioning shaft, and wherein said adjustment means includes a left knob mounted on the left positioning shaft, whereby the rotational movement of said right knob and the rotational movement of said left knob causes the respective positioning shafts to rotatably position the viewing mirrors.

5. The optical device defined in claim 4 wherein the oversized aperture is provided with a diameter greater than the diameter of the positioning shaft, whereby the planar movement of the right knob and the planar movement of the left knob adjusts the angular position of the respective mirrors.

6. The optical device defined in claim 4 wherein the right knob and the left knob include locking means to lock the knobs and the corresponding viewing mirrors in the desired positions.

7. The optical device defined in claim 4 including a partition mounted in the viewing aperture of said housing and extending between said right viewing mirror and said left viewing mirror.

8. The optical device defined in claim 7 wherein said journal includes a two-sided journal mounted in and extending through said partition, said journal being connected to the first end of the right positioning shaft on one side of said journal and also being connected to the first end of the left positioning shaft on an opposite side of said journal.

9. The optical device defined in claim 1 including a mounting means for positioning said viewing mirrors in alignment with the eyes of a viewer.

10. The optical device defined in claim 9 wherein said mounting means includes an adjustable head strap connected to said housing.

11. The optical device defined in claim 9 wherein said mounting means includes an adjustable helmet, said housing being mounted on the front of said helmet.

12. The optical device defined in claim 9 wherein said mounting means includes padded edges to engage the face of the viewer.

13. The optical device defined in claim 1 wherein said housing includes at least two receiving apertures on a face of said housing with at least one receiving mirror mounted in each receiving aperture.

14. An optical device for viewing a two dimensional image in three dimensional form comprising:

a) a housing, including a receiving aperture on a face of said housing and a viewing aperture on an opposite face of said housing;

b) a receiving mirror mounted in the receiving aperture of said housing for receiving a two dimensional image;

c) a right viewing mirror positioned in the viewing aperture and mounted on a right positioning shaft, said right viewing mirror in optical communication with said receiving mirror for providing a first image of the two dimensional image;

d) a left viewing mirror positioned in the viewing aperture, spaced apart from said right viewing mirror, and mounted on a left positioning shaft, said left viewing mirror in optical communication with said receiving mirror for providing a second image of the two dimensional image different from the first image;

e) a two-sided center journal mounted in the viewing aperture of said housing between said right viewing mirror and said left viewing mirror, said center journal adjustably retaining a first end of the right positioning shaft on a right side of said center journal and a first end of the left positioning shaft on a left side of the center journal such that a longitudinal center axis of the right positioning shaft is vertically spaced apart from a longitudinal center axis of the left positioning shaft; and f) adjustment means, including a right knob mounted on a second, external end of the right positioning shaft for positioning said right viewing mirror, and a left knob mounted on a second, external end of the left positioning shaft for positioning said left viewing mirror, whereby the positioning of said viewing mirrors causes the first image and the second image to merge and form a three dimensional image.

* * * * *